Oct. 23, 1928.

O. M. RIES 1,688,987

BASIN MOUNTING

Filed Dec. 13, 1926

Oscar M. Ries
Inventor

By Geo. Kirk
Attorney

Patented Oct. 23, 1928.

1,688,987

UNITED STATES PATENT OFFICE.

OSCAR M. RIES, OF TOLEDO, OHIO.

BASIN MOUNTING.

Application filed December 13, 1926. Serial No. 154,442.

This invention relates to lavatory equipment.

This invention has utility when incorporated in mountings for wash basins, especially as in proximity to water supply spigots.

Referring to the drawings:

Fig. 1 is a front view, with parts broken away, of an embodiment of the invention, say for mounting in a basement, cellar, or factory, in proximity to hot and cold water supply pipes, to be directly carried by a pipe;

Fig. 2 is a section on the line II—II, Fig. 1, looking in the direction of the arrow;

Fig. 3 is a fragmentary side elevation, showing the bracket as sustaining the basin in out of use position; and Fig. 4 is a section on the line IV—IV, Fig. 3.

Building wall 1 is shown as having straps 2 anchoring hot water pipe 3 and cold water pipe 4 in descending positions vertically as to such wall 1. At about waist high position for a man, these pipes 3, 4, are provided with elbows 5 fitted with close nipples 6, couplings 7, to spigots 8, 9, thus giving a desired spacing from the wall 1 for the spigot discharges.

The basin mounting as disclosed comprises a primary bracket having opposing plate portions 10, 11, with integral connecting eye 12 at one end and opposing arc portions 13, 14, as seats for engaging the pipe 3 as drawn into clamping position by bolts 14' through the plates 10, 11, adjacent the clamp seats 13, 14. Nuts 15 on the bolts 14 lock the primary plate bracket in position.

The eye 12 is forked and carries bolt 16 having nut 17 thereon. About this bolt 16 between the forks of the eye 12 is metal strap 18 embracing tongue 19, having clamp connection therewith by bolt 20 having wing nut 21. The tongue 19 terminates in wrap or eye 22 for depending bolt or stem 23, having thereon sleeve 24. Nut 25 engages lower threaded portion 26 of the stem 23, and as adjusted toward the sleeve 24, clamps basin support in assembled position therewith.

This basin support has an opening 27 in horizontal ledge portion 28. The stem 23 extends through this opening 27. From the terminal portions of the ledge 28 are depending basin-steadying ears 29, while the plate portion 30 of the support extends downward with an inward portion 31 therefrom to the basin terminus 32 of the support.

The portion 31 is shown as having rearwardly struck out from opening 33 a hook 34 as an out-of-position support engaging eye 35 in rim 36 of basin 37. Upon removal of the basin 37 from its support on the hook 34, the eye 35 is positioned to engage the projecting end 26 of the stem 23 below the nut 25. In this position for the basin 37, its rim 36 is positioned to be steadied against lateral swinging by engaging the ears 29, the elongation of the opening 27 in the ledge 28 permitting adjustment for thus holding the basin 37, while the support portions 31, 32, coact with the side and under outer portions of the basin 37. The basin as thus quickly and snugly assembled is in position in desired proximity to the spigot or spigots 8, 9. The location of the pipe clamp 10, 11, may be at a desired point along the pipe 3, or 4, as well as at the desired angular direction therefrom. The bolt 16 clamps the link extension portion 18, 19, against swinging as to the bracket portion 10, 11. The wing nut 21 permits rocking of the stem 23 as to the bolt 16, and locking may then occur for the desired positioning of the basin support as locked by the nut 25 with the stem 23. There is accordingly ample flexibility in mounting and adjustment to care for wide ranges of assembly, altho in use there is not normally occasion for readjustment, except possibly for different basins. As the basin is used, the rim 36 remote from the eye 35 may be lifted to clear the eye 35 from the stem portion 26, and the basin then emptied, say in the waste or sewer, and be in readiness for reuse, or for hanging on the hook 34, or elsewhere, as desired. The bracket, as portions 10, 11, may grip stem 38 rising therefrom to carry soap dish 39.

What is claimed and it is desired to secure by Letters Patent is:

1. A support for a basin provided with an annular rim and an eye through said rim, and a projection for entering the basin eye, said support having an extension below the projection, said extension contoured to nest with the basin outer side and extending under the basin, and said support having additional basin rim engaging means upon opposite sides of the projection for holding the basin supported against rocking when having its eye engaged by the projection.

2. A basin mounting comprising a bracket having a mounting clamp, a depending stem positioned by said clamp, and a basin engaging element fixed to said stem comprising means for engaging the basin rim upper portion at one point and providing a lug on each side of said point against which the basin rim edge is held for holding the basin against shifting and a depending basin supporting projection integral with said lugs.

3. A pipe engaging mounting clamp, a link extending therefrom, a depending stem from said link, said stem being adapted to extend through the rim of a basin, and an additional basin-engaging element comprising lugs against which the basin rim is held by said stem on each side of said stem and depending means extending to the underside of the basin as a sustaining seat.

4. A hanger comprising a clamp, a link extending from said clamp, a friction lock for anchoring the link in angular position as to the clamp, a depending stem from the link, a sleeve on said stem, an under support for a basin having basin steadying projections, and a nut for clamping the support on the stem against the sleeve, said support contoured to nest with the basin outer side and to form basin engaging means for holding said basin against rocking and in a horizontal position, and said support having a portion thereof bent outward and upward to form a hook for suspending said basin.

In witness whereof I affix my signature.

OSCAR M. RIES.